F. A. HOSCHKE.
INSTRUMENT FOR MEASURING WAVE FREQUENCY.
APPLICATION FILED OCT. 30, 1916.
1,278,470.
Patented Sept. 10, 1918.
3 SHEETS—SHEET 1.
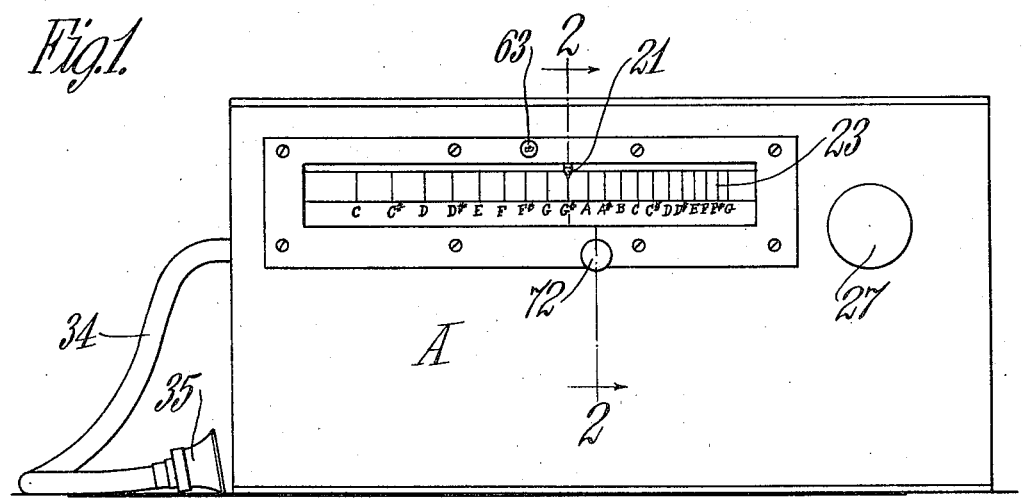
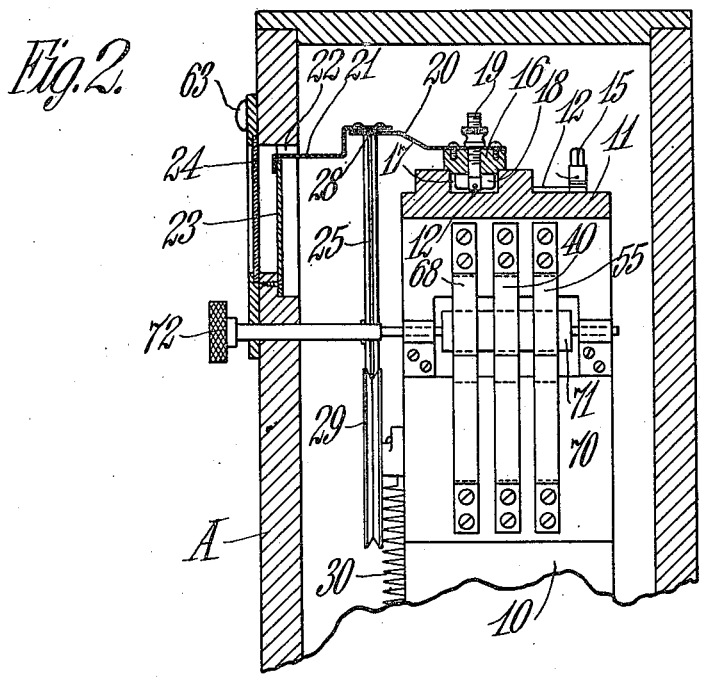
WITNESSES:
H. E. Hartwell.
INVENTOR.
Frederick A. Hoschke.
BY Chapin & Neal
ATTORNEYS.

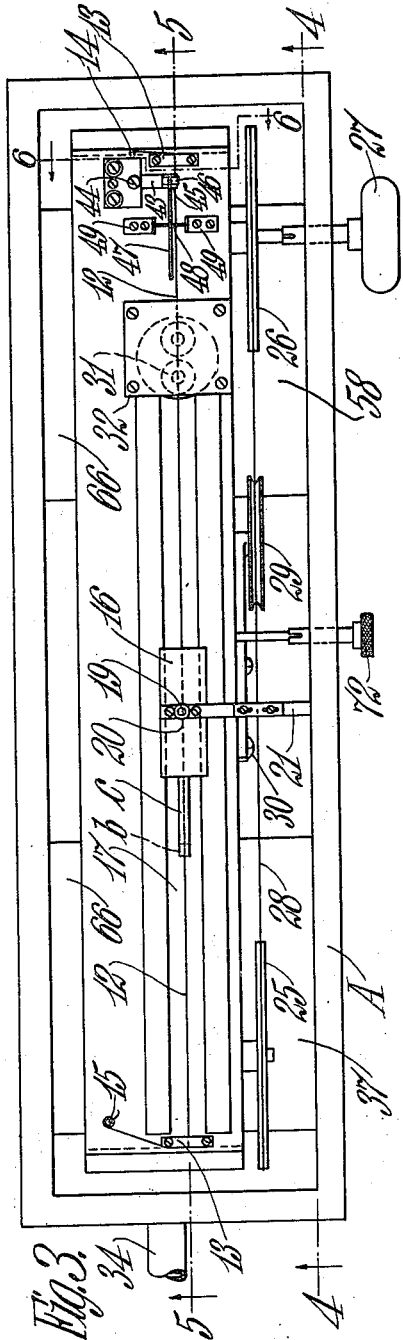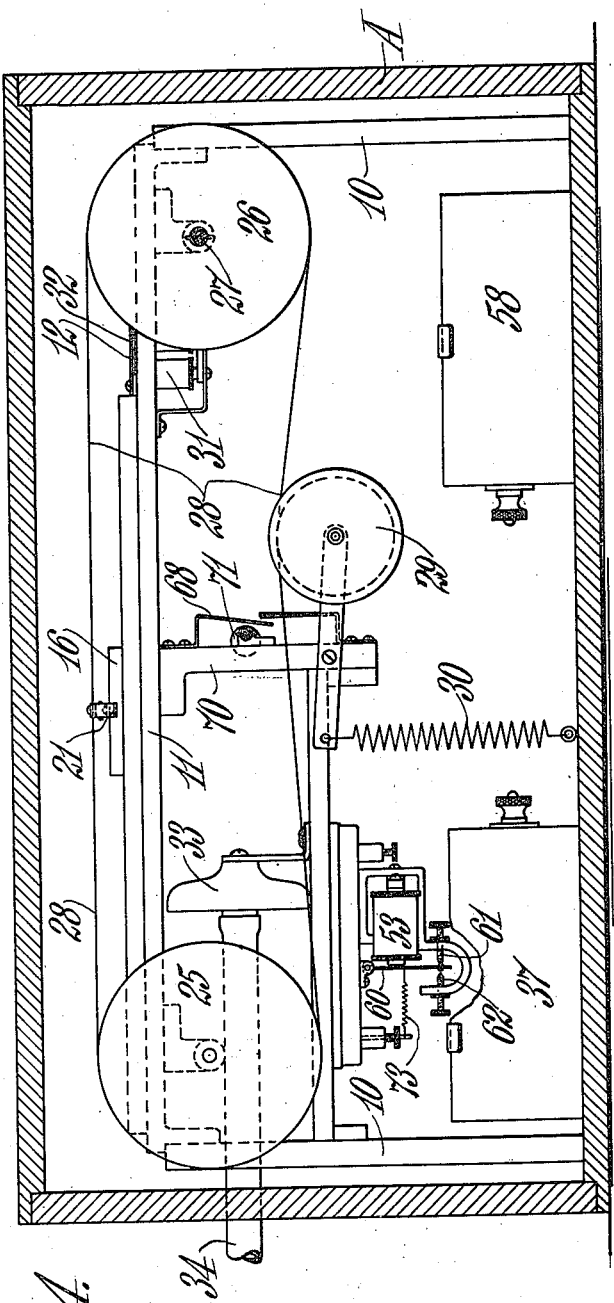

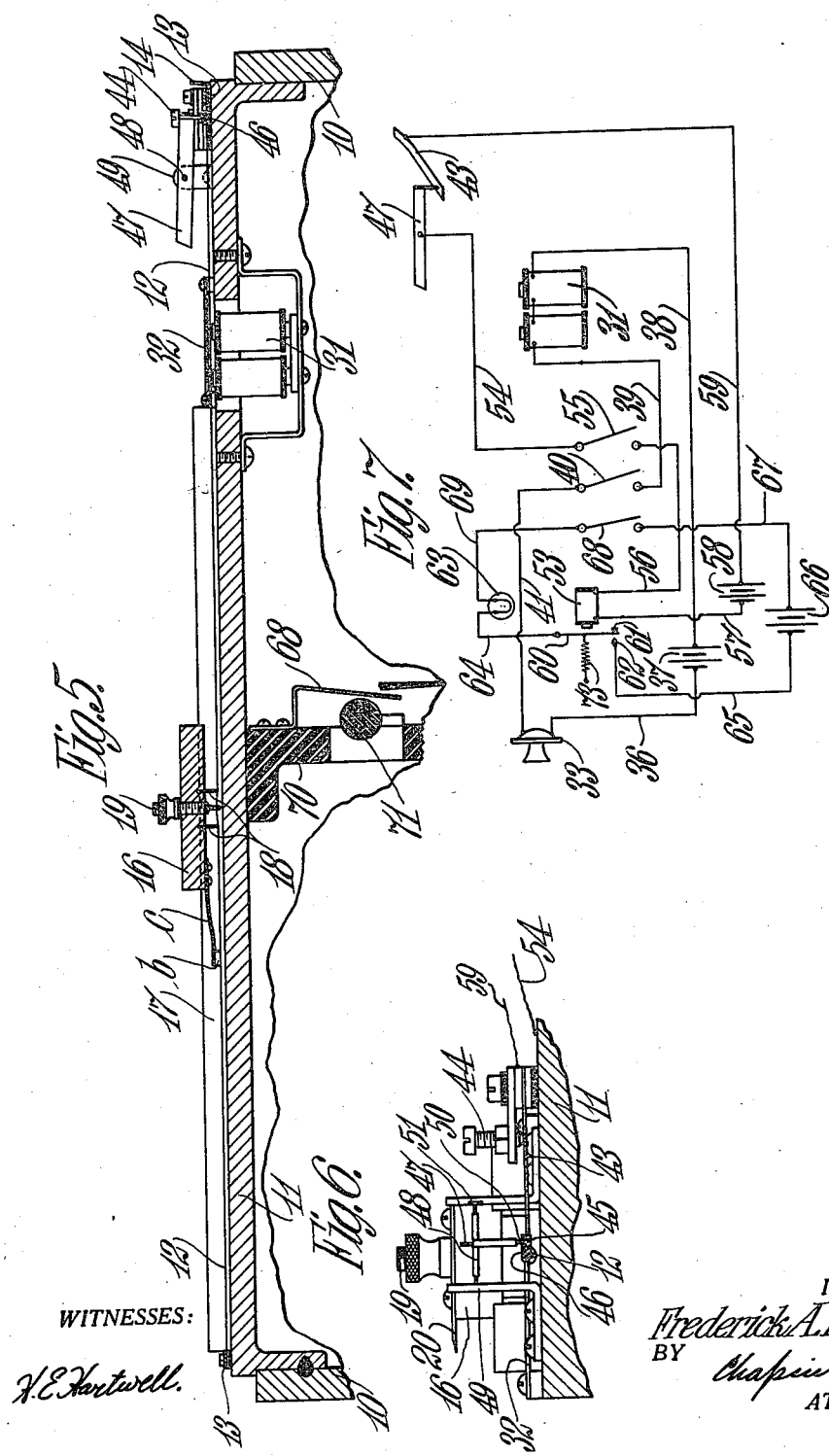

UNITED STATES PATENT OFFICE.

FREDERICK A. HOSCHKE, OF SPRINGFIELD, MASSACHUSETTS.

INSTRUMENT FOR MEASURING WAVE FREQUENCY.

1,278,470.  Specification of Letters Patent.  Patented Sept. 10, 1918.

Application filed October 30, 1916. Serial No. 128,639.

*To all whom it may concern:*

Be it known that I, FREDERICK A. HOSCHKE, a citizen of the United States of America, residing in Springfield, in the county of Hampden and State of Massachusetts, have invented certain new and useful Improvements in Instruments for Measuring Wave Frequency, of which the following is a specification.

This invention relates to improvements in physical instruments for measuring wave frequency and finds one preferred specific use as a means for indicating the frequency or the pitch of sound waves.

The invention, for example, has an application in the musical art, particularly in voice culture. Singers experience considerable difficulty in mastering sight reading because they must first acquire what is technically known as interval sense. They must be able to judge accurately the interval between the various tones and half tones of the chromatic scale and acquire ability to produce the exact tone desired. The present invention, in one of its specific uses, provides a means whereby a singer may test the tones produced and determine wherein they are faulty so that gradually accuracy in sight reading and judgment of intervals may be attained.

The invention in its broad aspect has for an object to provide in an instrument of the character described, a single vibratory member of alterable frequency which may be adjusted to vibrate at any desired rate, said member adapted to be vibrated by the wave, the frequency of which is to be measured, when the frequency of the latter is equal to that of the member, the arrangement being characterized by providing a standard with which the frequency of the wave to be measured may be compared.

Another object of the invention is to provide in an instrument of the class described a vibratory member, such as a piano string, for example, arranged under a constant tension and provided with means for altering its periodicity or rate of vibration, together with means whereby the wave, the frequency of which is to be measured, may be caused to act on said string and to vibrate the latter when its periodicity becomes equal to that of the string, together with devices to indicate when the string and actuating wave are in synchronism.

Other objects and advantages of the invention will appear in the description to follow and will be particularly pointed out in the annexed claims.

The invention is disclosed in an illustrative embodiment in the accompanying drawings, in which—

Figure 1 is a front elevational view of the instrument;

Fig. 2 is an enlarged cross-sectional view thereof taken on the line 2—2 of Fig. 1;

Fig. 3 is a top plan view of Fig. 1 with the cover of the instrument removed;

Fig. 4 is a sectional elevation taken on the line 4—4 of Fig. 3;

Fig. 5 is a fragmentary sectional elevation taken on the line 5—5 of Fig. 3;

Fig. 6 is a partial cross-sectional view taken on the line 6—6 of Fig. 3; and

Fig. 7 is a diagrammatical view showing the electrical connections of the instrument.

The invention will be described with reference to these drawings which show merely one operable embodiment of the invention for illustrative purposes. The particular embodiment chosen to illustrate the invention is adapted for indicating the pitch or periodicity of sound waves. There are other uses to which the invention may be put, however, and the specific use to be described is chosen simply to enable a clear understanding of the invention to be obtained.

In general, the instrument involves a suitable vibratory member, such as a piano string, for example, stretched between fixed supports under a definite tension and provided with means for varying the effective length of the member, so that its periodicity or natural rate of vibration may be varied, together with devices to indicate the effective length of the member and thus its rate of vibration or pitch. The vibratory member constitutes a standard of known periodicity or frequency with which the pitch of the sound wave may be compared. The sound wave, the pitch of which is to be measured, is arranged to act upon the vibratory member, and, when its pitch becomes exactly equal to that of the member, to vibrate the latter. The sound wave thus actuates the vibratory member when its pitch comes into synchronism with that of the string and devices are provided to indicate the fact of synchronism in a visual manner.

Within the case A of the instrument and supported by spaced standards 10 from the base thereof is a horizontally disposed plate 11 of non-magnetic material and preferably metal. The vibratory member may advantageously consist of a piano string 12 which is supported by and extends between blocks 13 attached to plate 11 as best shown in Figs. 3 and 5. String 12 is fixed at one end to a pin 14 and passes through apertures in the blocks 13 and is secured at its other end to a pin 15. The latter constitutes a means for placing the string under tension and is analogous to the device used in a piano for the same purpose. The tension of string 12, after once being adjusted is not disturbed, and this being true and the diameter of the string being constant, its pitch, periodicity, or frequency varies with its length, and a movable support is provided to effect this variation. A rider 16 is slidable longitudinally of plate 11 in ways 17 formed therein (Figs. 2, 3 and 5) and depending from the rider are a pair of spaced plates 18 which just contact with string 12. Centrally between plates 18 is a pin 19 vertically adjustable relatively to rider 16, which pin has an eye therein through which the string 12 passes. The arrangement is such that the string is drawn up slightly between plates 18, as shown in exaggerated form in Fig. 5, so that each plate constitutes a support or fret for the string. The length of the string between the right hand plate 18 and the right hand block 13 is the portion utilized in this invention and may be considered as the "effective" length of the string. The other portion of the string is rendered ineffective by a damper b which is supported by a leaf spring c from rider 16 and is forced against the string by the spring shown in Fig. 5.

Fixed to the upper face of rider 16 and extending laterally to one side thereof is an arm 20 and secured to the latter is a pointer arm 21 which is slidable in an opening 22 in the front face of casing A with its end in close proximity to a scale 23 fixed in the said front face, all as clearly shown in Fig. 2. Scale 23 is visible through the window 24 and may be graduated in any units desired, such as vibrations per second, for example, or in musical tones, as shown in Fig. 1, the illustrated graduations being best suited for the specific use of the invention described. The pointer 21 and scale 23 show the effective length of string 12 and thus its natural rate of vibration, or pitch or frequency. In order to propel rider 16 along the ways 17, two pulleys 25 and 26 are provided which are suitably journaled in brackets secured to the under face of plate 11. Pulley 26 is rotatable from without casing A by a handle 27 which has a removable engagement with the shaft of pulley 26, as clearly shown in Fig. 3. A belt 28, which may advantageously consist of a wire, travels around pulleys 26 and 27 and is maintained under suitable tension by an idler 29 constantly forced against wire 28 by a spring 30 in a manner obvious from Fig. 4. Wire 28 is clamped between arms 20 and 21, as shown in Fig. 2, so that, as handle 27 is turned, the rider 16 may be moved to vary the effective length of string 12 and with it the pointer 21 which indicates this effective length in the desired units.

Supported from plate 11 (Figs. 3 and 5) is an electro-magnet 31, the pole pieces of which are arranged closely adjacent string 12. Above the latter a plate 32 of magnetic material is fixed to plate 11 in spaced relation therewith. The purpose of plate 32 is to intensify the magnetic field about string 12 produced by magnet 31 in a manner to be described for obviously the string itself presents only a very small area to the magnet. By increasing the thickness of plate 32, the action of magnet 31 may be intensified but, for the present purposes, only a relatively weak magnetic field is necessary as will appear. A transmitter 33 of any suitable type, such as a telephone transmitter, for example, is supported below plate 11, as shown in Fig. 4, and a flexible tube 34 leads from the mouthpiece of the transmitter through casing A to a mouthpiece 35 into which the sound, the pitch of which is to be measured, is directed. The electrical connections of the transmitter 33 and magnet 31 as well as those between other parts of the apparatus to be described have been purposely omitted from Figs. 1 to 6, inclusive, to avoid confusion with mechanical structure. These connections are separately shown in the diagram of Fig. 7. Transmitter 33 is connected by a wire 36 to a battery 37 and thence by a wire 38 to one terminal of magnet 31. From the other terminal of the latter, a wire 39 extends to one pole of a switch 40 and the other pole of the latter is connected by a wire 41 to the transmitter. The sound waves impressed upon the transmitter produce a varying magnetic field about the poles of magnet 31, and the fluctuations in the magnetic field have the same periodicity as that of the sound wave impressed on the transmitter, as is generally well known. The magnetic field about string 12 is, as has been stated, relatively weak and is purposely so in order to prevent a forced vibration of the string. The force acting on the latter is slight but, as is well known, when a slight force occurs periodically with the same frequency as that of the string or when the two come into synchronism, the force is sufficient to cause the string to vibrate at its natural rate of vibration.

The vibrations produced in string 12 by the means described are, however, microscopic only and consequently cannot be visually detected. Means are provided, nevertheless, whereby a clear visual signal is given when the string 12 vibrates, which means will now be described with particular reference to Figs. 3, 5, and 6. Fixed to and insulated from plate 11 is a leaf spring 43, the tension of which is adjustable by a screw 44 in a manner clearly obvious from Fig. 6. The free end of spring 43 is arranged to overlie string 12 and encircling this free end is a rubber band 45, the lower portion of which rests lightly on the string. A strip of platinum 46, bent in U-shape has one leg slipped between the band 45 and the upper face of spring 43, so that it contacts with the latter, and the other leg overlies the upper face of band 45, as clearly shown in Fig. 6. A rocker arm 47 is pivoted intermediate its ends at 48 to a pair of spaced brackets 49 and bears at one end a platinum contact 50 to engage strip 46. Pivot 48 makes electrical contact with a platinum strip 51 set into one of brackets 49 (see Fig. 6). Rocker arm 47 is arranged so that contact 50 rests lightly on the platinum strip 46 so that normally a low resistance electrical connection exists between these elements. Spring 43 and rocker 47 are in circuit with a relay 53 mounted within casing A, as shown in Fig. 4. Referring to Fig. 7, rocker 47 is electrically connected by its bracket 49 and plate 11 (Fig. 6) to a wire 54 which leads to one pole of a switch 55 and the other pole of the latter is connected by a wire 56 to one terminal of the coil of the relay 53. The other terminal of the latter is connected by a wire 57 to a battery 58 and thence by a wire 59 to the spring 43 (through the intermediary of its supporting member—Fig. 6). When switch 55 is closed, coil 53 normally holds a pivoted armature 60 against a stop 61 and away from a contact member 62. The latter and armature 60 control an electrical circuit to the indicating device which in the embodiment of the invention illustrated takes the form of an incandescent lamp 63 which is mounted above scale 23 in the front wall of casing A, as shown in Figs. 1 and 2. Lamp 63 is connected to armature 60 by a wire 64 and contact 62 to a battery 66 by a wire 65. From the battery a wire 67 extends to one terminal of a switch 68 and the other terminal of the latter is connected by a wire 69 to lamp 63. The switches 40, 55, and 68 are mounted on a base 70 of insulating material and are movable in unison into engagement with their contacts by an eccentric 71 (Figs. 2 and 4) also of insulating material, which eccentric may be turned by a handle 72 from without casing A, the handle having a removable engagement with the shaft of the eccentric as shown in Fig. 3. These switches are normally closed and their function is merely to open the otherwise closed circuits to the relay 53 and magnet 31, when the instrument is not in use. It is to be noted that switch 68, the outer one as viewed in Fig. 4, is arranged to close before the switches 40 and 55, as shown by its lower contact portion which is bent inwardly beyond the others. The purpose of this arrangement is to momentarily illumine lamp 63 before its circuit is opened by relay 53 which, of course, happens as soon as switch 55 is closed. This arrangement shows to the operator at the start that the lamp itself is in working order, which is essential information since the indications of the lamp are relied upon to indicate the fact of synchronism.

The contact between spring 43 and rocker 47 is normally of low resistance and lamp 63 is unilluminated due to the energization of relay 53. When, however, string 12 is set in vibration spring 43 is moved therewith at a rapid rate and the contact, normally of low resistance, becomes of much higher resistance owing to the vibrational disturbance so that relay 53 is not sufficiently energized to attract armature 60 and the latter is pulled against contact 62 by a spring 73 whereby the lamp 63 becomes illuminated. Thus, as soon as the pitch of the sound wave is in synchronism with that of the string, the lamp gives a visual signal to the operator.

Other means of indicating the fact of synchronism will suggest themselves to those skilled in the art, but the described arrangement is preferred and particularly advantageous on account of its sensitiveness and accuracy. The visual electric lamp signal is important, as distinguished from mechanically operated signals, on account of its freedom from inertia. There is no inertia which must first be overcome before the signal will operate. The absence of inertia makes for improved accuracy for the signal indicates instantaneously when the desired pitch is reached. For example, a singer striving to produce a given tone must know instantly when the desired tone is reached. It clearly would not do, for the musical use of the invention, to have the indications occur at a time later than that when the string commenced to vibrate for the singer will modulate the voice until the signal operates and, if the signal does not operate instantly, the singer may be misled into thinking that the desired tone has been produced when as a matter of fact the desired tone has been passed shortly before the signal indicated due to the time interval necessary for its operation.

The electric lamp signal is also self restoring which is particularly desirable for other reasons than the mere elimination of labor on the part of the operator. This advantage may best be illustrated by considering an example of one use of the instrument. Assuming that a singer produces the correct tone, the signal whether self restoring or not would indicate this fact. However, suppose that the tone was reached but instantaneously or, in other words, that the singer fails to maintain the precise tone, the lamp will indicate this failure, but if the signal had not been self restoring, the singer would not realize the failure to maintain the desired tone. The singer cannot be misled with the signaling means described for the true conditions are indicated to correctly show all the inaccuracies in the singer's voice.

The instrument described does not, it is true, give direct readings. It is rather a testing instrument for the accurate determination of periodicity or pitch, and its accuracy in use may best be effected by the described arrangement. Thus, the instrument in its musical adaptation can be set to a standard tone, which the singer has to patiently strive to reach, and, until the tone is precisely reached, no signal is given to indicate success. It would be otherwise with direct indications for the singer might be content if substantially the desired tone was reached as indicated by a pointer closely approximating a desired graduation on the scale.

The instrument may be used in many ways in the musical art, and one important application is in voice culture. Perfection in sight reading, generally difficultly acquired, may be obtained with the aid of the instrument. The latter in reality takes the place of a teacher and provides stern but, nevertheless, impartial and accurate criticism by its failure to give successful indications unless success is attained. It is also of great value in teaching interval sense for by successively setting the instrument to the various notes of the scale and striving to produce these notes, one can eventually acquire accuracy in the estimation of the intervals. Moreover, the instrument is useful in the analysis of tone or to determine whether a certain note comes from the chest, throat, or head. By placing the mouthpiece on the chest, for example, the string will be vibrated only when the tone is produced in the chest, and a throaty tone even of correct pitch would fail to vibrate the string since the mouthpiece is too far removed from the seat of the vibrational disturbance and is closed by contact with the chest to sound waves which are present in the air about.

The structure heretofore described is characterized by the fact that a single vibratory member is provided, the pitch of which may be altered as desired. This feature is believed to be an important one in that any desired pitch may be obtained as distinguised from instruments wherein a plurality of vibratory members each set for a given pitch are used. With the latter structure, provision is made only for a limited number of tones and interpolation between the tones is obviously impossible. With the structure disclosed, however, the length of the string may be varied from a minimum to a maximum by as small increments as may be desired so that it will be seen that the string may be adjusted to vibrate at an infinite number of periodicities.

It will thus be seen that I have provided an improved instrument for the measurement of wave periodicity which is particularly adapted for testing the pitch of sound waves. The invention, however, is capable of other uses than the specific one described for illustrative purposes, and its scope is defined by the appended claims rather than by the foregoing description.

What I claim is—

1. An instrument for measuring wave frequency, comprising, a vibratory string stretched between fixed supports under a given tension, another support movable on the string to vary its effective length and thus its periodicity, means adapted for actuation by the wave to be measured to vibrate said string when the periodicity of the wave becomes equal to that of the string, an electric lamp, and means controlled by said wire to illuminate the lamp when the wire is set in vibration.

2. The combination in an instrument of the class described of a vibratory string stretched between fixed supports under a constant tension, another support movable on the string to vary its effective length and thus its periodicity and an electromagnet adapted to be so energized as to produce a varying magnetic flux on said string and arranged to vibrate the latter only when the frequency of the variations becomes equal to that of the string, and means to indicate when the string is set in vibration.

3. An instrument for measuring the frequency of sound waves, comprising, in combination, a vibratory string, means to vary the frequency of said string, and electromagnetic devices arranged to act on said string, said devices adapted to produce a varying magnetic flux when acted upon by the sound wave and to vibrate said string only when the frequency of the sound wave becomes equal to that to which the string is adjusted.

4. An instrument for the measurement of wave frequency, comprising in combination, a vibratory string, means to vary the length thereof so that it may be adjusted to vibrate at various frequencies, said string adapted to be acted upon by the wave, the frequency of which is to be measured, and to be vibrated thereby only when the frequency of the wave is in synchronism with that to which the string is adjusted, an electrical signal, and means controlled by the string to actuate the signal when the string is in vibration.

5. An instrument for measuring the frequency of sound waves, comprising, a vibratory string stretched between fixed supports under constant tension, an electro-magnet arranged in proximity to said string and adjacent one of said fixed supports, a movable support on said string arranged to travel between said electromagnet and the other fixed support, a transmitter electrically connected to said electro-magnet through a suitable source of electro-motive force whereby a wave impressed upon the transmitter may create a varying magnetic flux about said string, the portion of said string subjected to said flux arranged to be adjusted by the movable support to vibrate at any desired frequency, all constructed and arranged so that the string may be set in vibration by the electro-magnet only when the frequency of the sound wave becomes equal to that of the string, and means to indicate when the string is in vibration.

6. The combination in an instrument of the class described of a vibratory string, means to vibrate the latter and means to indicate when the string is in vibration, said means comprising an electric lamp, an electrical circuit for said lamp involving a source of energy and a switch, an electromagnet normally holding said switch in open position so that the lamp is unilluminated, a second switch having a part in engagement with said string adjacent one of its supports, electrical connections between said switch and magnet through a source of eletrical energy, said last-named switch being normally of low resistance but arranged when vibrated by the string to become of relatively high resistance so that the magnet releases the first-named switch to cause the illumination of said lamp.

7. The combination in an instrument of the class described, of a plate formed with ways, a vibratory string mounted on and extending between supports fixed on each end of said plate, a slide movable in said ways, spaced projections extending from the slide into engagement with the string, and a member adjustable in said slide and arranged intermediate the projections, said member provided with an eye to encircle said string and adapted to force the portion of the string between the projections away from the plane of the rest of the string so that the projections form frets for the string.

8. An instrument for testing the frequency of sound, comprising, in combination, a suitable casing, a vibratory string supported therein under constant tension, an electro-magnet arranged in proximity to said string and adjacent one end thereof, an intermediate support on said string arranged to travel between the electro-magnet and the other end of the string, means operable from without the casing to move said support and thus vary the effective length of the string, a graduated scale in the casing, a pointer supported by the intermediate support and movable over said scale to indicate the effective length of the string, a transmitter within the casing having a mouthpiece extending without the casing, electrical connections between the magnet and transmitter through a source of electrical energy, a switch having a part adapted to rest on said string adjacent its first-named end, a second electro-magnet, electrical connections between the latter and said switch through a source of electrical energy, a second switch normally held open by the second magnet but adapted to be closed when the first-named switch is vibrated by said string, an electric lamp mounted in the casing, and electrical connections between the lamp and second switch through a source of electrical energy, all constructed and arranged so that sound impressed on the transmitter may vibrate said string when its frequency is equal to that to which the string is set and so that said lamp may be illuminated when said string is vibrating in synchronism with the sound wave.

9. An instrument for testing the frequency of sound waves, comprising in combination, a suitable casing, a frame supported therein and formed with ways, a metallic wire stretched between fixed supports on the end of said plate, a member slidable in said ways having a fret to engage said wire, means operable from without the casing to move said member, a graduated scale on the casing, a pointer secured to said member and movable adjacent said scale, whereby the movable fret may be adjusted to vary the effective length of the wire, an electro-magnet beneath the wire, a transmitter, electrical connections between the magnet and transmitter through a source of electrical energy, a flexible tube extending from the transmitter outside the casing, a mouthpiece on the end of said tube, whereby sound impressed on the transmitter may cause a varying magnetic field about said wire and may vibrate the latter when the frequency of the sound waves is equal to that to which the wire is adjusted, an incandescent lamp in said casing, and means controlled by the wire to illuminate the latter when said wire is set in vibration.

10. An instrument for measuring the frequency of sound waves, comprising, a wire stretched between fixed supports, under constant tension, a movable fret on the wire arranged to be adjusted to vary the effective length of the wire, an electro-magnet in proximity to the wire, a transmitter upon which the sound may be impressed, electrical connections including in series the magnet, transmitter, and a source of electrical energy, whereby the wire may be set in vibration when the frequency of the sound waves becomes equal to the frequency of the effective length of the wire, and means to indicate when the latter is in vibration, said means comprising a spring of alterable tension having one end resting upon said wire, a pivoted rocker arm having a part adapted to lightly rest on said spring, a switch, a spring adapted to close said switch, an electro-magnet adapted to open the latter, a series-circuit including the last named magnet, spring, rocker arm, and a source of electrical energy, whereby said switch is normally held open, an incandescent lamp, and a series circuit including the latter, said switch and a source of electrical energy, all constructed and arranged so that the contact between the rocker arm and its spring is disturbed by the vibration of said wire so that said switch may be released by its electro-magnet to close a circuit to said lamp.

FREDERICK A. HOSCHKE.